United States Patent [19]
Ueda et al.

[11] Patent Number: 5,130,277
[45] Date of Patent: Jul. 14, 1992

[54] CERAMIC COMPOSITE MATERIAL AND PROCESS OF MANUFACTURING THEREOF

[75] Inventors: Hisao Ueda; Hiroshi Sasaki, both of Urawa; Koichi Niihara, Yokosuka, all of Japan

[73] Assignee: Mitsubishi Mining & Cement Company, Ltd., Tokyo, Japan

[21] Appl. No.: 393,937

[22] Filed: Aug. 15, 1989

[30] Foreign Application Priority Data

Nov. 24, 1988 [JP] Japan .................... 63-294676

[51] Int. Cl.$^5$ .................. C04B 35/04; C04B 35/56
[52] U.S. Cl. .................... 501/88; 501/108; 501/122; 264/65
[58] Field of Search .......... 501/88, 89, 90, 87, 501/108, 109, 122; 264/56, 65

[56] References Cited

U.S. PATENT DOCUMENTS

| | | | |
|---|---|---|---|
| 3,344,080 | 9/1967 | Livey et al. | 501/88 |
| 3,765,912 | 10/1973 | Gates, Jr. et al. | 501/88 |
| 4,298,385 | 11/1981 | Claussen et al. | 501/88 |
| 4,463,058 | 7/1984 | Hood et al. | 501/88 |
| 4,673,658 | 6/1987 | Gadkaree et al. | 501/89 |
| 4,745,091 | 5/1988 | Landingham | 501/89 |
| 4,767,727 | 8/1988 | Claussen et al. | 501/88 |

FOREIGN PATENT DOCUMENTS 0246268 12/1985 Japan .................... 501/95

OTHER PUBLICATIONS

"Fracture Energy of MgO–SiC whisker Composite Ceramics" Khida et al., J. Mater Sci. Japan 36 (400) pp. 17-21 Jan. 1987.

Primary Examiner—William R. Dixon, Jr.
Assistant Examiner—Paul Marcantoni
Attorney, Agent, or Firm—Hoffman, Wasson & Gitler

[57] ABSTRACT

A MgO/SiC composite material in which SiC particles with nano-meter order in size are dispersed within MgO matrix grains can be prepared by hot-pressing the mixture of fine MgO and SiC powders. Addition of SiC particles in the range of 5 volume percent to 50 volume percent to the MgO matrix increased remarkably the fracture strength and the hardness in a nanometer-order structure of the composite.

3 Claims, 4 Drawing Sheets

Dispersion Model of SiC particles in MgO matrix

Fig.1

Dispersion Model of SiC particles in MgO matrix

CERAMIC COMPOSITE MATERIAL AND PROCESS OF MANUFACTURING THEREOF

FIELD OF THE INVENTION

The present invention relates to ceramic composite material and a method of fabrication of the same. Particularly, it relates to the specific structure of ceramic composite material with high strength, high thermal durability and high resistance to thermal shock, and a method of fabrication of the same.

DESCRIPTION OF THE PRIOR ART

While MgO material is excellent in thermal resistance, durability and electric insulating property, it does not satisfy enough strength sufficiently to be used in a structural material, because it is poor in strength at high temperatures, toughness and thermal shock resistance.

MgO and SiC are representatives of oxide and non-oxide ceramics, and are leading candidate materials for many modern-day engineering applications. A critical factor which limits the widespread applications of these materials is a lack of reliability caused by the severe sensitivity to catastrophic, brittle failure. Improvement of fracture strength and toughness of these materials would considerably expand these application ranges.

Thus, many attempts have been made to improve significantly the physical and mechanical properties of these ceramics by incorporating the second-phase dispersion such as particulate, whisker and fibers of such as SiC or $Si_3N_4$ in a matrix of material such as alumina grains, and sintering the incorporated material. Especially, the high strength can be afforded by such procedure. Among them, there is reported the composite of MgO-SiC series in Osaka Chemical Laboratory Report, in that the strength thereof is remarkably improved to enable the improvement of the MgO properties. The report concludes that SiC fine particles are incorporated especially at the boundary of the MgO grains as the matrix and therefore prevent the propagation of cracks in the matrix by crack deflection mechanism, which contributes the significant improvement of toughness and strength of MgO matrix with incorporation of SiC particles.

It is known that the ceramic sintered body such as alumina material has the matrix of anisotropic particles (grains), and then stress will be caused at the boundary of the grains by the mismatch of thermal expansion, and therefore, the boundary will be an origin of fracture to lower the strength of the sintered body.

The ceramic composite material incorporating whisker and the like to obtain the higher strength are known, but most of such composite materials are aiming at the higher toughness by utilizing the higher tensile force of whisker. Then, it is difficult to obtain the essentially high strength of the matrix of the ceramic material. The particles and whiskers dispersed in the ceramic matrix in a nanometer order form will trap or detain the propagation of cracks, therefore, the toughness of the matrix is expected to be improved. In this matrix, the defects or flaws present at the boundary of the grains, which will generate the origin of the cracks is not changed or retains, and then the significant improvement of the strength of the ceramic matrix is not found.

MgO can be considered to be promising ceramics for many modern-day engineering applications because of their desirable properties including high refractoriness, good hardness and chemical stability. However, this oxide ceramics suffers from relatively low fracture toughness and strength, significant strength degradation at high temperatures and poor thermal-shock fracture resistance. Thus, many attempts have been made to resolve these problems of MgO ceramics by incorporating the second phase dispersed, for example, SiC particles, SiC whisker and $ZrO_2$ particles.

There has been reported that $ZrO_2$ particles dispersions are observed to improve remarkably the fracture toughness and strength of MgO ceramics due to its stress-induced transformation of $ZrO_2$. However, this mechanism is useful only below the transformation temperature, that is, 400° to 600° C.

The fracture toughness and strength of the MgO ceramics are also increased significantly by incorporating the SiC whisker, but the SiC whisker reinforced composites are difficult to prepare the dense materials by pressure-less sintering.

Based on the fabrication process, it is more desirable to use the particle as a second phase dispersion.

To overcome this problem, the inventors have been studying the MgO-SiC nanometer order composites, in which the SiC particles are dispersed within the MgO matrix grains.

Ceramic composite materials can be divided in two categories; microcomposites and nanocomposites. In the microcomposites, the micrometer order scale dispersions such as particles, whiskers and fibers are dispersed at the vicinity of the grain boundaries of the grain matrix. On the other hand, in the nanocomposites, the nanometer order scale dispersion such as particles, whiskers and also structure defects such as dislocations, twins and stacking faults are incorporated at the grain boundaries and/or inside of the grains.

The microcomposites have been investigated mainly to improve the fracture toughness, $K_{1C}$ and then the strength of the matrix, while the nanocomposites are to improve the fracture strength and toughness, and also to add the new functions.

Further, $ZrO_2$ dispersion has been studied to improve remarkably the fracture toughness and strength of the matrix due to its stress-induced transformation. (See F. F. Lange, "Transformation Toughening", J. Mater. Sci., 17[1]225-262(1982); and N. Claussen, "Strength Strategies for $ZrO_2$-toughened Ceramics at High Temperatures", Mater. Sci. and Eng., 71[1]23-28(1985)".)

The $ZrO_2$-reinforced composites show the strength degradation at relatively low temperatures, while the SiC-whisker reinforced composites are difficult to prepare the dense materials by pressureless sintering.

SUMMARY OF THE INVENTION

With the foregoing considerations in mind, the present invention contemplates the provision of the ceramic composite having a nanometer order size dispersion, which evidences the high strength enough to be used in a ceramic engine.

It is an object of the present invention to provide a strong ceramic composite of MgO matrix in which fine particles of SiC are incorporated.

It is another object of the present invention to provide a MgO ceramic composite in which the physical and mechanical properties of MgO are significantly improved.

It is further object of the present invention to provide the ceramic MgO composite material in use for refractories, heat-resisting material and electronic ceramic material, which have high resistance to thermal shock, and a significantly improved fracture strength even when the crystal size thereof is not so large.

The essence of our invention resides in the discovery that the MgO composite having size of 0.5 micrometer to 100 micrometer in which fine particles of SiC with size of less than 1.0 micrometer are dispersed and incorporated in the MgO matrix, can evidence a significantly improved strength.

DETAILED DESCRIPTION OF PREFERRED EMBODIMENTS

In accordance with the present invention, the structure of the ceramic composite has a grain matrix of MgO having size of 0.5 micrometer to 100 micrometer, in which fine particles of SiC having size of below 1.0 micrometer are dispersed and incorporated.

For the preparation of the inventive ceramic composite, MgO is divided into the particles of below 5 micrometer in size, and SiC is very finely divided into the particle size of below 0.1 micrometer, and then, the resulting MgO particles and the SiC very finely divided particles are mixed and then, the resulting mixture is formed into a shape and fired to form a sintered body of the composite.

The MgO powder used in the manufacturing of the inventive composite is preferably in a highly pure phase, in which impurities are negligible so that Na, Fe, Si and Ga should be less than 10 ppm. The average particle size and surface area of this material were 0.1 micrometer and 20 m$^2$/g, respectively.

The SiC material used is preferably a beta-SiC powder with an average size of below 0.3 micrometer, and free carbon containing below 0.4 weight percent, and the major impurities such as Al, Fe and Ti totaling below 900 ppm. For a comparison example, beta-SiC powder with an average size of 2 micrometer is used.

Concretely, MgO having average particle size of 0.1 micrometer available from Ube Industries Ltd., and two types of beta-SiC having average particle sizes of 2 micrometer and below 0.3 micrometer available from Ibden Co. were selected as starting powders. The compositions containing various volume fraction of SiC particles are mixed by the conventional ball milling technique in the highly pure ethanol with Al$_2$O$_3$ balls for 12 to 24 hours. Then, the dried mixture of MgO and SiC is hot-pressed in N$_2$ atmosphere at 1,500° to 1,900° C. with applied pressure of 10 MPa to 60 MPa.

The densities of the hot-pressed composites are measured by an Archimedes method using toluene. The components of the composites are determined by X-ray diffraction analysis.

Further, fracture toughness of the composites of the present invention is evaluated by the indentation microfracture method with indenter loads of 0.49 to 18.6 Newton. Hardness of the composite materials of the present invention is measured using a high temperature Vickers hardness tester (Nikon, QM) at room temperature. The tests are carried out at load of 9.8 Newton and loading duration of 15 seconds. The three point bending test is used to estimate the fracture strength under a crosshead speed of 0.5 mm per minute; specimen size: 3×4×45 mm, span:30 mm. The tensile surfaces in the bending tests are perpendicular to the hot pressing axis and are polished to 3 micrometer diamond paste.

The densities of the composites prepared in accordance with the present invention are strongly dependent on the volume fraction of the particulate dispersion and the hot-pressing temperature. The near full densities over 99% were observed for the hot-pressed materials depending on the volume fraction of SiC particles, and are achieved at 1700° C. up to 10 volume percent SiC, at 1800° C. up to 20 volume percent SiC, and at 1900° C. up to 30 volume percent.

X-ray diffraction analysis revealed that the MgO-SiC composites were composed of only MgO and beta-SiC, and were free from other impurity phases.

Figure 3:
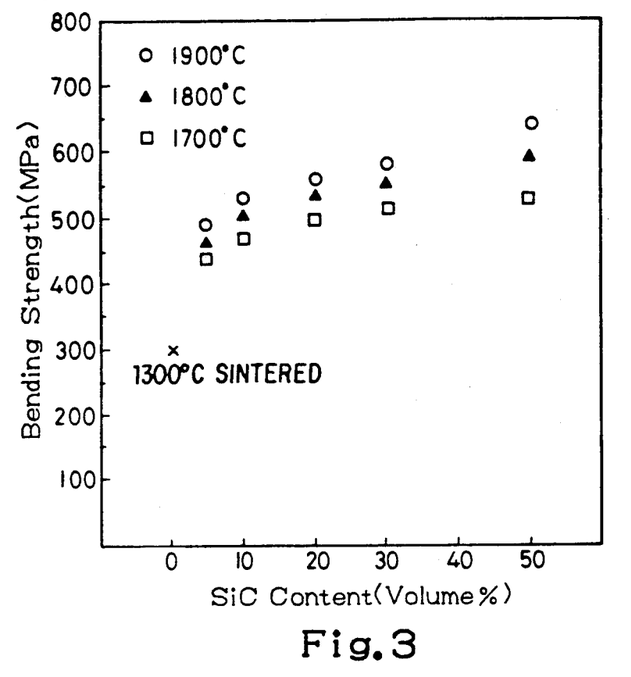
FIG. 3 is a graph illustrating the change of tensile strength measured against the volume fraction of SiC in the MgO matrix grains in accordance with the present invention.
Figure 5:
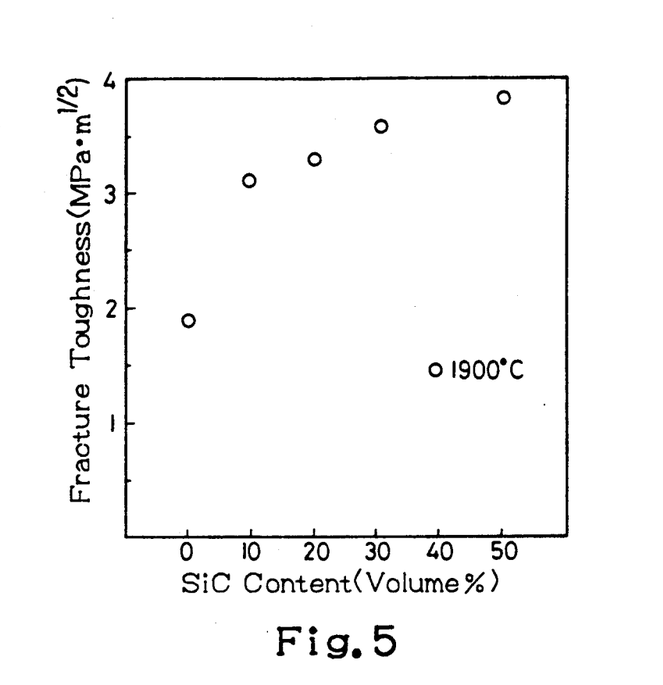
FIG. 5 is a graph illustrating the change of fracture toughness measured against the volume fraction of SiC of the sintered MgO matrix composite as prepared in accordance with the present invention.

The dependence of fracture strength and toughness of the MgO-SiC nanocomposites with volume fraction of SiC is shown in FIGS. 3 and 5. The fracture strength of MgO was improved from 330 to 540 MPa by incorporating 10 volume percent SiC particles within the MgO grains, while the fracture toughness was increased from 1.9 to 3.1 MPam$^{\frac{1}{2}}$ with 10 volume percent SiC.

The critical flaw sizes estimated from standard fracture mechanics relationship using the above-mentioned data are approximately −9 micrometer, which is almost equal to that for the MgO-10 vol.% SiC composite (−10 micrometer). The increase of the strength of the composite at room temperature, therefore, will be attributed to the improved toughness by the SiC particles dispersed within the matrix grains.

Figure 6:
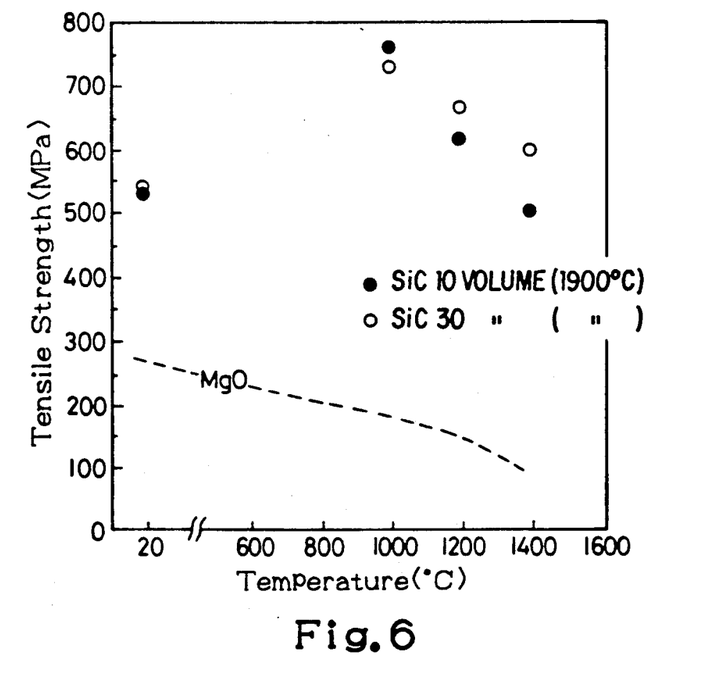
FIG. 6 is a graph illustrating the tensile strength at the high temperature, measured against the SiC fraction in the SiC particles dispersed MgO ceramic composites as fabricated in accordance with the present invention.

No strength reduction is observed up to 1300° C. for the particle dispersion within the matrix grains on the high temperature strength as shown in FIG. 6. At the temperature range from 1000° to 1400° C., the MgO-SiC composite exhibits the considerably higher strength than that at room temperature.

It is well known that the grain boundary sliding and/or cavitation are responsible for the high-temperature strength degradation of the oxide ceramics.

Figure 1:
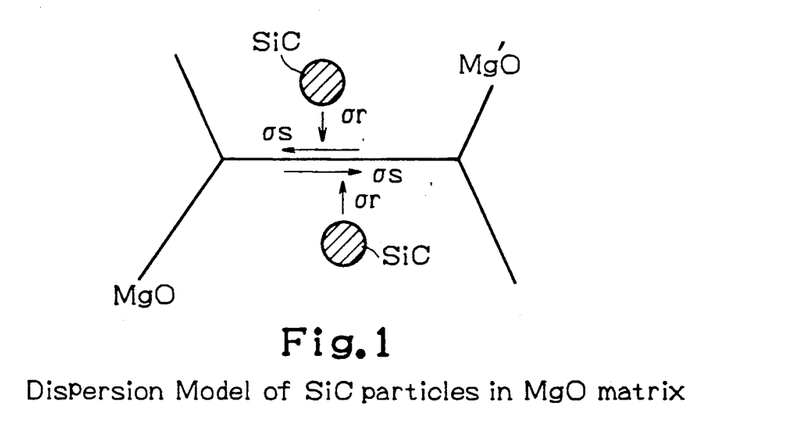
FIG. 1 is a sketch of a structure of the dispersion model illustrating schematically the SiC nanometer order-size particles dispersed in the MgO matrix grains, in which the residual compressive stress is generated by thermal expansion mismatch on inhibition of grain boundary fracture and/or slow crack growth.

Another possible mechanism for the high-temperature strength increase is the creep prohibition by the dislocation pinning with the fine dispersion within the matrix. Therefore, addition of SiC fine particles in MgO matrix grains reduces remarkably the critical flaw size in the MgO matrix as shown in the following discussion. FIG. 1 is a sketch of effects of residual compressive stress caused by thermal expansion mismatch on inhibitation of grain boundary fracture and/or slow crack growth.

The arrows $\delta_r$ and $\delta_s$ as shown in FIG. 1 represent the radial stress from thermal expansion mismatch between MgO and SiC and the shear stress from anisotropic thermal expansion of MgO respectively. In the inventive composite, there is no other phases at the MgO-SiC interface, and the MgO and SiC are bonded directly without any impurity phases. Accordingly, it is reasonable to believe that the residual compressive microstress arisen from the thermal expansion mismatch between MgO and SiC exists without relaxation around the SiC particles within the MgO grains.

The SiC particles within the MgO grains are located near the grain boundaries as shown in FIG. 1, and then, this high compressive stress can cancel out the shear stress generated at the grain boundaries by the anisotropic thermal expansion of MgO, which may cause the grain boundary fracture. Therefore, it might be concluded that the extremely high strength observed for the MgO/30 volume % 0.3 micrometer composite is chiefly due to the decrease in critical flaw size by the compressive stress around the SiC particles dispersed within the MgO grains.

The compressive stress around the SiC particles within the MgO grains is approximately 1000 MPa even at 1000° C. This compressive stress can squeeze the grain boundaries and inhibit the grain boundary sliding and/or the growth of cavities which cause the strength degradation at high temperature. Thus, the SiC dispersion into the MgO grains is thought also to improve the high-temperature strength of the MgO. As expected from these discussions, the MgO/SiC nanometer-order size composite kept its highest strength even at the high temperature up to about 1000° C. as shown in FIG. 6.

The incorporation of the finer SiC particles will improve the fracture strength not only at room temperature but also at high temperatures as shown in FIG. 6. The second phase dispersion effects on mechanical properties are observed.

Figure 7:
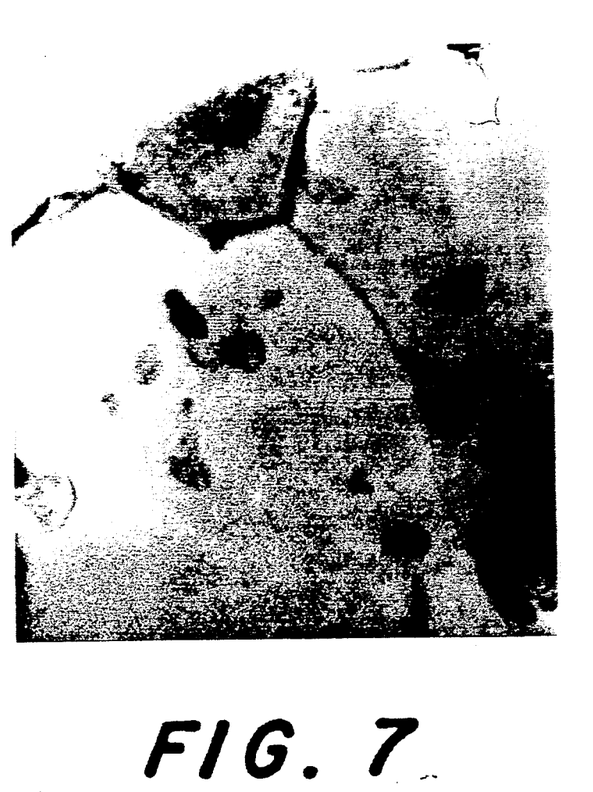
FIG. 7 is a photograph of transmission electron microscope of the SiC 20 vol. % 0.3 micrometer diameter dispersed MgO matrix grains, as fabricated in accordance with the present invention.

TEM observations revealed that the SiC fine particles in the MgO-SiC composites of the present invention are dominantly located within the MgO grains rather than at the grain boundaries as shown in FIG. 7. FIG. 7 exhibits the high resolution TEM picture of the finer SiC particle dispersed within the MaO grains. There seems to be no impurity phases at the MgO-SiC interface, and the MgO and SiC are bonded directly without any impurity phases therebetween. Thus, it is reasonable to think that the residual compressive microstress caused from the thermal expansion mismatch between MgO and SiC exits without relaxation around the SiC particles within the MgO grains. The inventors believes that this high compressive micro-stress plays important role on the observed decrease in the critical flaw size.

FIGS. 3 and 5 give the variation of fracture strength and toughness of the MgO/SiC composites with the volume fraction of SiC. Observations by TEM revealed that the SiC dispersions are mainly located within the MgO grains for the MgO/SiC composites.

The MgO/0.3 micrometer-SiC particle composite of the present invention can be successfully prepared by the conventional powder metallurgical technique. The inventive composite evidences the extremely high strength of over 750 MPa even at high temperature. From the observation by scanning electron microscopy (SEM) of the polished surface of the composite, the significant improvement in strength is thought to be due to the nanometer-order size structure, i.e. the finer SiC particles located within the MgO grains.

In the ceramic composite of the present invention, SiC very fine particles are dispersed in the crystal grains of the MgO matrix. The composite is in form of nanometer order size as to strengthen or improve the properties of the ceramic material. The residual compressive stress based on the difference of thermal expansion is generated in each of MgO crystal grains by dispersing very fine particles of SiC in the crystal grains of MgO.

The residual stress caused by the thermal expansion mismatch will cause the compressive stress field at the grain boundary, and threat the advancement of cracks will be trapped, or repressed by deflection of the grain.

In reference to FIG. 1, the mechanism is further described as follows: The inventive composite has a structure as shown in FIG. 1, in that very fine SiC particles are dispersed in each of MgO matrix grains. Mismatch of thermal expansion will generate the residual stress in the matrix by dispersing SiC fine particles respectively in each of MgO crystal grains. This stress will cause the compressive stress field at the boundary to the adjacent MgO grain, and the point of advancing crack will be trapped or deflected at the stress field, so as to suppress the advancement of the cracks. The SiC particles within the MgO grains are located near the grain boundaries as shown in FIG. 1, and then, this high compressive stress can cancel out the shear stress generated at the grain boundaries by the anisotropic thermal expansion of MgO, which will cause the grain boundary fracture. Therefore, it might be concluded that the extremely high strength observed for the composite of MgO/SiC of 30 volume % and 0.3 micrometer in size may be chiefly due to the decrease in critical critical flaw size by the compressive stress generated around the SiC particles dispersed within the MgO grains. (The compressive stress around the SiC particles within the MgO grains is approximately 1,000 MPa even at 1,000° C.)

This compressive stress can squeeze the grain boundaries and inhibits the grain boundary sliding and/or suppresses the growth of cavities which will cause the strength degradation at high temperature. Thus, the SiC particles in the MgO matrix can suppress advancing of dislocation in the MgO matrix at the high temperature and therefore, suppress deformation of MgO grain at the high temperature so as to produce the high strength and the high toughness of the ceramic composite.

The key of the ceramic composite of the present invention is that the matrix grains are of MgO, the dispersion fine particles are of SiC. The MgO matrix grains has size of 0.5 micrometer to 100 micrometer, and fine particles of SiC has size of below 1.0 micrometer which are dispersed in the MgO matrix grains. The starting materials are a divided MgO particles of below 5 micrometer in size, and a finely divided SiC particles with size of below 0.1 micrometer. Both particles are mixed and formed into a sharp, and fired to produce a sintered body.

The reason why the MgO grain size ranges 0.5 micrometer to 100 micrometer is that the maximum strength of the sintered body can be obtained at such size range for MgO grains. The reason why the SiC particle size ranges no more than 1.0 micrometer is that it is the optimum size range for being incorporated in the MgO matrix grain.

The reason why the size of the starting material MgO particles has the range of no more than 5 micrometer is to obtain easy sintering in the manufacture of the ceramic composite. The reason why the starting material SiC particles has the size ranging no more than 1.0 micrometer is that if the size of SiC particle exceeds 1.0 micrometer, micro-cracks will be possibly caused, and that SiC particles with such size range can be easily incorporated in the matrix grain, and further that in that range, even while the residual stress is raised over the limit to some extent, the micro-cracks can not be generated.

Preferably, the MgO matrix grain should be densely sintered, and the SiC particles should be uniformly dispersed in the matrix grain. Such dispersion phase should have the thermal expansion coefficient less than that of the matrix, and further, should maintain the strength and hardness respectively higher than those of the matrix even at the high temperature. Further, SiC particles should be easily incorporated into the grain of the matrix during the step of firing to be sintered.

Preferably, the firing temperature should be enough high to result in sufficient sintering of the ceramic matrix. The temperature of 1,300° C. can enable to obtain enough sintering of the matrix. In consideration of suppressing shrinkage when reheated, the firing temperature is preferably higher than 1,400° C.

The inventive ceramic composite can be used for heat resisting material and refractory material with high corrosion resistance, high strength at high temperature, and high thermal shock resistance.

The present invention is further illustrated by the following example to show manufacture of the inventive ceramic composite and the result of measurement of the properties of the composite, but should not be interpreted for the limitation of the invention.

EXAMPLE

Preparation of Starting Particulate Material

MgO material of 1000A manufactured by and available from Ube Corporation, which has average size of 0.1 micrometer was used to make matrix grains, and SiC of beta-random ultrafine (tradename) particles available from Ibiden Corporation was used for nanometer-order size particles in amount of 5 volume percent to 50 volume percent on the basis of the amount of the matrix material.

Both particles were mixed, and then, ethyl alcohol was added as a media, and wet mixed, and ground for 12 hours in an alumina ball mill. Then, after drying enough the mixed resulting particulate material, the dried particulate material was further ground in dry alumina ball mill for 24 hours to produce the starting particulate material in use for the manufacturing of the composite samples.

Sintering Treatment

An inductive heating hot press machine available from Fuji Denpa Kougyou Inc. Ltd. was used for sintering treatment.

The resulting particulate material of about 32 g was put in a graphite die of 50 mm in inner diameter, and the preparatory pressure of 10 MPa was applied, and then the die was heated. For this treatment, the inner surfaces of the die was covered with BN powder coating, so as to prevent direct contact of the particulate material to the inner surface, i.e. the press surface for the punch bar, and thereby preventing the reaction of the particulate materials with the die surface.

The hot press condition was that after raising the temperature to the sintering temperature, the die was maintained at this sintering temperature, and then, the pressure for pressing in the die was raised to 30 MPa, and the argon gas was an atmospheric gas. The resulting sintered body was in a circular cylinder of about 50 mm in diameter and 4 mm in height.

Manufacture of Samples

The resulting sintered body was polished at the both press surfaces by a diamond wheel to form the surfaces having roughness of #1000, and then cut into a rectangular prism 45 mm long, 4 mm wide and 3 mm high in accordance with JIS regulation R1601.

The resulting cut sample was exerted to a bending test by three point loading.

Further, the surface of the ceramic sintered composite was polished, and observed by an electro-microscope. The photography of the surface of the inventive composite by an electromicroscopic observation is shown in FIG. 7. It apparently supports that the inventive composite has the structure as mentioned above. In the photograph of FIG. 7, an elliptical shape observed approximately at the center of the photograph is SiC fine particle with diameter of about 0.3 micrometer.

Measurement of Relative Density

Relative density was measured by using an Archimedian method, in a toluene solution from an average value calculated from three values resulted from the measurement of three or more samples for the above mentioned bending test.

Measurement of Bending Strength (Fracture Strength)

The bending strength was measured by three point loading method with loading rate of 0.5 mm per minute, span length of 30 mm at the room temperature, and in an oxidizing atmosphere at the higher temperature (maximum of 1,400° C.). The measurement at the higher temperature was carried out by using only one test piece. The test pieces were polished in tensile surface to have a miller face polish by using diamond paste of 3 micrometer in diamond particle size, and the edge was worked having the angle of 45° with width of about 0.1 mm in loading faces.

Measurement of Vickers Hardness and Fracture Toughness

Vickers hardness and toughness were measured by using a micro Vickers hardness tester. The fracture toughness was measured at lording of 1 kg maintaining the lording for 10 seconds by using an IM (Indentation Microfracture) method.

SiC Dependence with Relative Density

Figure 2:
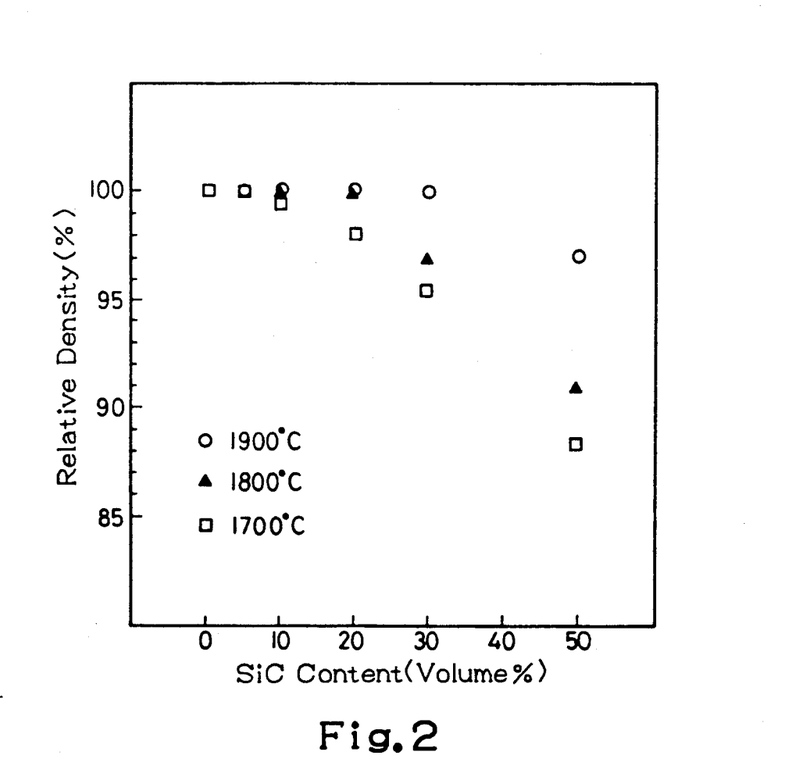
FIG. 2 is a graph illustrating the relative density measured against the volume fraction of SiC of the nanometer-order composite prepared at the designated temperature in accordance with the present invention.

The result of measuring relative density of the composite as prepared in accordance with the present invention revealed that the MgO composite with SiC particles was densified. FIG. 2 illustrates the variation of relative density with the sintering temperature and the SiC fraction.

It is not evidenced from the result of X-ray diffraction measurement that there is reaction between MgO material and SiC particles in the temperature range up to 1,900° C. The theoretical densities are MgO;3.58 g/cm², and SiC;3.21 g/cm², and assuming that the composite is consisting only of MgO and SiC, the theoretical density is calculated to be 100% density, and then, the relative density was calculated on the basis of the such calculated theoretical densities.

It was found that the composite without SiC incorporation has 100% relative density when it was prepared by firing at the temperature higher than 1,300° C. However, it revealed out that the increase of the content of SiC particles incorporated will suppress remarkably the sintering of the matrix, and then, the higher sintering temperature is necessary to obtain densified MgO composite.

It was observed that when the composite was fired at 1,900° C. for its preparation, the resulting relative density was about 100% in case of the SiC content ranging less than 50 volume percent. Further, when the composite was prepared by firing at 1,800° C., the measured relative density was about 97% in case of the SiC fraction ranging more than 20 volume percent. It is believed that the incorporation of SiC particles will suppress the densification of MgO matrix materials, i.e. the presence of SiC particles among the MgO grains will suppress the voids present among MgO grains, and then suppress the sintering of the ceramic matrix. Accordingly, the voids can not be reduced during firing, and such voids spaces will remain. The increase of SiC particles incorporated will raise the voids among the MgO matrix.

Effect to the Bending (Tensile) Strength

Figure 4:
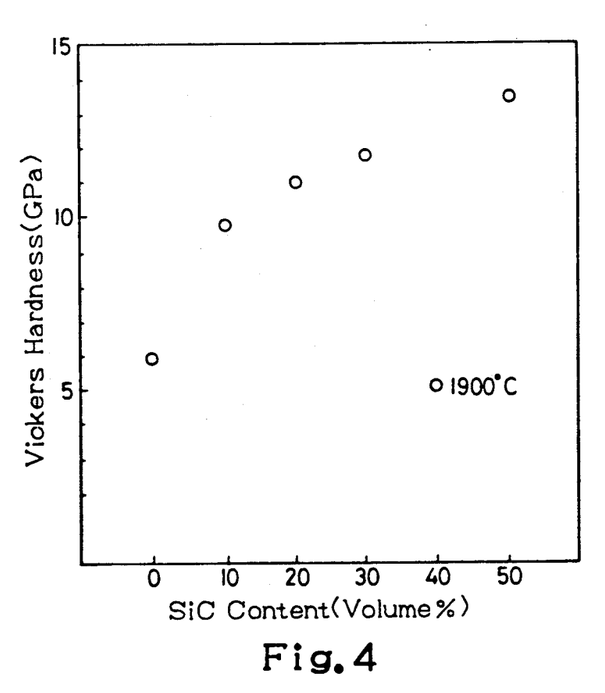
FIG. 4 is a graph illustrating the Vickers Hardness measured as a volume fraction of SiC dispersed in MgO matrix grains regarding the MgO composite as prepared by firing MgO material incorporated with fine SiC particles in accordance with the present invention.

FIGS. 4 and 5 are graphs illustrating the SiC fraction dependence of the Vickers Hardness and fracture toughness for the MgO-SiC composite.

Vickers hardness was measured on samples of the composite incorporating SiC 10 volume percent which were prepared by firing at the temperature of 1,900° C. This result; 10.5 GPa in Vickers hardness of the 10% SiC-MgO composite evidences the remarkable improvement; almost twice of the simple MgO material as prepared at 1,300° C.; the improvement of about 10 GPa. Further, it was found that when the SiC fraction is increased, the hardness is gradually increased.

The result revealed that the hardness was increased to three time of that of the simple MgO material when the SiC fraction ranges upto 50 volume percent.

The measurement of fracture toughness revealed the similar tendency to as above mentioned. It evidences that the higher the SiC fraction is the higher the fracture toughness is, and that the composite incorporating 50 volume percent SiC has 3.8 MPa×m$^{\frac{1}{2}}$, i.e. twice of the toughness of simple MgO material as fired at 1,300° C. The composite without SiC particles was found to have linear dent of crack formed by the Vickers dent test. In contrast, the composite with incorporation of SiC particles was found to have significantly curved faces at the dent formed by Vickers test, which seems to be formed by deflection (and/or crack branching) caused by advance of crack. The formation of deflection will raise the toughness of the composite, and then, improve significantly the strength of the ceramic composite.

Influence of SiC fraction to Hardness and Fracture Toughness

FIG. 6 is a graph illustrating the change of tensile strength measured against the atmospheric temperature, of the MgO sintered bodies incorporating SiC respectively in the content range of 10 volume percent and 30 volume percent, as fired at the temperature of 1,900° C., measured in an oxidizing atmosphere. The measured sample was one respectively for each temperature. It is known that MgO monocrystal will be significantly reduced at its strength when it is maintained at the higher temperature. The SiC/MgO composite was found to maintain its strength at least until 1,400° C. and to the similar strength to that at the room temperature. The composite incorporating SiC of 10 volume percent was found to raise significantly the strength when it was prepared by firing at the temperature approximate to 1,000° C. It was found that the composite heated at about 1,400° C. was whiten at its surfaces, that is seemingly a result from SiC oxidation. This SiC oxidation will reduce the strength of the composite. It was evidenced that the incorporation of SiC particles improved significantly the strength at the higher temperature.

The SiC/MgO matrix material of the present invention will enable to provide the following technical significance.

Firstly, it was found to improve significantly the fracture strength and toughness of the MgO ceramic material, and further to improve the properties of the MgO material.

Secondly, it can enable to fabricate easily the material strong and tough at the higher temperature which can be used at the higher temperature. Thirdly, it facilitates to make use of MgO characteristic at the higher temperature.

The MgO-based nanocomposites prepared by the sintering techniques were found to improve significantly the fracture strength and toughness of MgO-ceramic materials. The main role of the second phase dispersion inside of the matrix grains is to decrease the critical flaw sizes by the residual compressive stress around the dispersed particles for the MgO-based nanocomposites, while it is to control the size, shape and distribution of MgO grains for the MgO-based nanocomposites.

As described in the foregoings, the inventive composite material will enable use of less expensive materials for the refractories, heat-resisting components with high strength and high toughness. Further, the heat resisting material with superior figure of merit can be more easily manufactured.

We claim:

1. A ceramic composite consisting essentially of MgO matrix grains having a size of from 0.5 to 100.0 micrometers and fine particles of SiC having a size below 1.0 micrometer dispersed in said matrix wherein the content of said SiC dispersed within the individual MgO grains ranges from 10% to 50% by volume of that volume of the MgO matrix wherein said composite has a bending strength of not less than 450 MPa.

2. A sintered body matrix of MgO having a grain size ranging from 0.5 to 6.0 micrometers, consisting essentially of MgO and from 10% to 50% fine particles of submicron size SiC particles dispersed within the individual MgO grains wherein said sintered body has a bending strength of not less than 450 MPa.

3. A process for manufacturing a ceramic composite of improved strength in accordance with claim 1, which comprises the steps of:
   (a) finely dividing MgO material into particles below 5.0 micrometers in size;
   (b) very finely dividing SiC material into particles below 1.0 micrometer in size;
   (c) mixing said finely divided MgO material with said very finely divided SiC material wherein said SiC material is from 10% to 50% by volume of the mixture;
   (d) forming said mixture into a shaped body; and
   (e) firing said shaped body at temperatures ranging from 1,700° C. to 1,900° C. to form a sintered body having a matrix grain size of from 0.5 to 100.0 micrometers.

* * * * *